United States Patent
Liang et al.

(10) Patent No.: US 12,549,311 B2
(45) Date of Patent: Feb. 10, 2026

(54) METHOD, DEVICE AND COMPUTER READABLE MEDIUM FOR COMMUNICATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 18/033,969

(22) PCT Filed: Oct. 27, 2020

(86) PCT No.: PCT/CN2020/124158
§ 371 (c)(1),
(2) Date: Apr. 26, 2023

(87) PCT Pub. No.: WO2022/087850
PCT Pub. Date: May 5, 2022

(65) Prior Publication Data
US 2023/0403116 A1    Dec. 14, 2023

(51) Int. Cl.
*H04L 5/00* (2006.01)
(52) U.S. Cl.
CPC .................. *H04L 5/0051* (2013.01)
(58) Field of Classification Search
CPC .... H04L 5/0051; H04L 5/0055; H04L 5/0094
USPC .................................. 370/329–330
See application file for complete search history.

(56) References Cited

U.S. PATENT DOCUMENTS

| | | | |
|---|---|---|---|
| 2013/0265955 A1 | 10/2013 | Kim et al. | |
| 2018/0212733 A1 | 7/2018 | Khoryaev et al. | |
| 2018/0270799 A1* | 9/2018 | Noh | H04L 27/261 |
| 2020/0205149 A1* | 6/2020 | Khoshnevisan | H04B 7/0695 |
| 2020/0266964 A1* | 8/2020 | Kang | H04W 72/23 |
| 2021/0376898 A1* | 12/2021 | Levitsky | H04B 7/0626 |
| 2022/0124736 A1* | 4/2022 | Huang | H04W 72/23 |
| 2023/0216636 A1* | 7/2023 | Li | H04L 5/0048 370/329 |

(Continued)

FOREIGN PATENT DOCUMENTS

| | | |
|---|---|---|
| CN | 106063180 A | 10/2016 |
| CN | 106063211 A | 10/2016 |

OTHER PUBLICATIONS

Qualcomm Incorporated "Potential coverage enhancement techniques for PUSCH" 3GPP TSG-RAN WG1 Meeting #102 e-Meeting, R1-2006977, Aug. 17-28, 2020.

(Continued)

*Primary Examiner* — Candal Elpenord
(74) *Attorney, Agent, or Firm* — Sughrue Mion, PLLC

(57) ABSTRACT

Embodiments of the present disclosure relate to methods, devices and computer readable media for communication. According to embodiments of the present disclosure, a terminal device receives configuration information from a network device. The configuration information at least indicates a set of configurations for transmitting a demodulation reference signal (DMRS). The terminal device receives downlink information from the network device which indicates an adaptive DMRS configuration. The terminal device transmits the DMRS to the network device based on the adaptive DMRS configuration. In this way, the configuration of reference signals can be changed dynamically.

17 Claims, 7 Drawing Sheets

(56) References Cited

U.S. PATENT DOCUMENTS

2023/0269722 A1* 8/2023 Xu .................. H04L 1/1822
370/329

OTHER PUBLICATIONS

International Search Report for PCT/CN2020/124158 dated, Jul. 14, 2021 (PCT/ISA/210).
Written Opinion of the International Searching Authority for PCT/CN2020/124158 dated, Jul. 14, 2021(PCT/ISA/237).

* cited by examiner

METHOD, DEVICE AND COMPUTER READABLE MEDIUM FOR COMMUNICATION

CROSS REFERENCE TO RELATED APPLICATIONS

This application is a National Stage of International Application No. PCT/CN2020/124158 filed Oct. 27, 2020.

TECHNICAL FIELD

Embodiments of the present disclosure generally relate to the field of telecommunication, and in particular, to methods, devices and computer storage media for adaptive reference signal configuration.

BACKGROUND

In order to support transmission of downlink and uplink transport channels, a terminal device needs to transmit UCI to a network device. The transmission of the UCI may be payload-based. The payload-based transmission refers to transmitting signals carrying information bits (also referred to as payload). In the payload-based transmission of UCI, information bits in the UCI will be encoded using channel coding and modulation. Then, the encoded information bits are multiplexed with Demodulation Reference Signals (DMRS) either in a Time Division Multiplexing (TDM) manner or a Frequency Division Multiplexing (FDM) before transmission. At the side of the network device, the network device will first perform a channel estimation using the DMRS, and then coherently combine the encoded information bits using the estimated channel. Thus, it is important to transmit reference signals properly.

SUMMARY

In general, embodiments of the present disclosure provide methods, devices and computer storage media for adaptive reference signal configuration.

In a first aspect, there is provided a method of communication. The method comprises: receiving, at a terminal device and from a network device, downlink information indicating an adaptive demodulation reference signal (DMRS) configuration; and transmitting, to the network device and based on the adaptive DMRS configuration, a DMRS on a physical uplink channel after a period associated with a time point of transmitting an acknowledgement to the downlink information.

In a second aspect, there is provided a method of communication. The method comprises: transmitting, at a network device and to a terminal device, downlink information indicating an adaptive demodulation reference signal (DMRS) configuration; and receiving, from the terminal device and based on the DMRS configuration, a DMRS on a physical uplink channel after a period associated with a time point of receiving an acknowledgement of the downlink information.

In a third aspect, there is provided a terminal device. The terminal device comprises a processor and a memory coupled to the processor. The memory stores instructions that when executed by the processor, cause the terminal device to perform: receiving, at a terminal device and from a network device, downlink information indicating an adaptive demodulation reference signal (DMRS) configuration; and transmitting, to the network device and based on the adaptive DMRS configuration, a DMRS on a physical uplink channel after a period associated with a time point of transmitting an acknowledgement to the downlink information.

In a fourth aspect, there is provided a network device. The network device comprises a processor and a memory coupled to the processor. The memory stores instructions that when executed by the processor, cause the network device to perform: transmitting, at a network device and to a terminal device, downlink information indicating an adaptive demodulation reference signal (DMRS) configuration; and receiving, from the terminal device and based on the DMRS configuration, a DMRS on a physical uplink channel after a period associated with a time point of receiving an acknowledgement of the downlink information.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
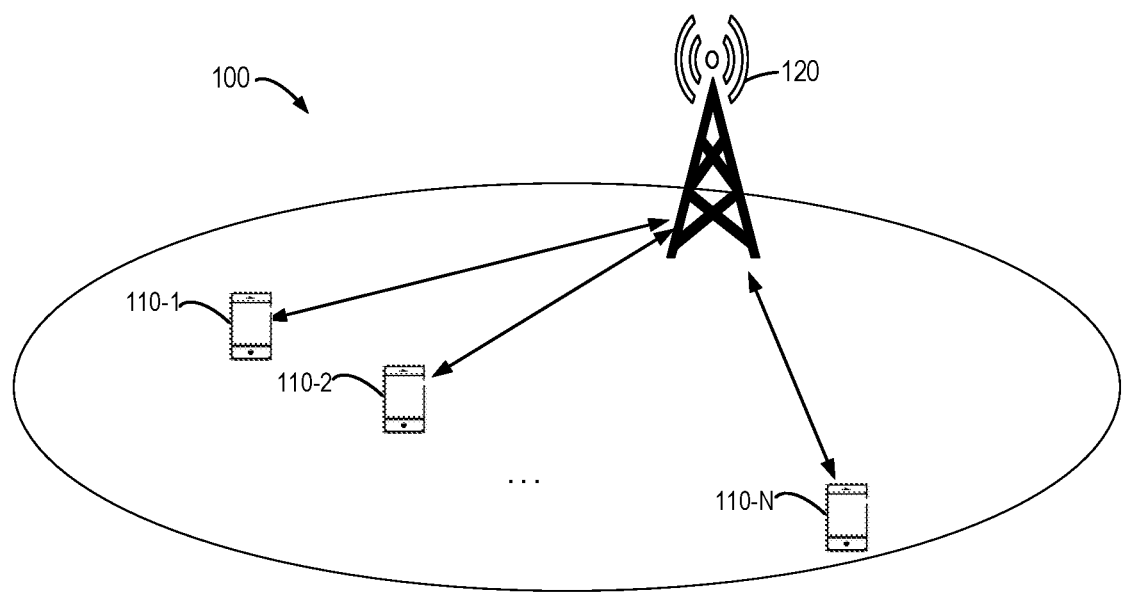
FIG. 1 is a schematic diagram of a communication environment in which embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As described above, it is important to transmit reference signals properly. Conventionally, configurations of the reference signals may be preconfigured. In some embodiments, the configuration may be transmitted to a terminal device via radio resource control (RRC) signaling. For example, in new radio (NR) systems, the number of DMRS symbols in a slot may be configured by RRC parameter dmrs-AdditionalPosition. If channel quality between a network device and the terminal device is not good enough, it may need more reference signals to improve estimation accuracy. If the channel quality is good enough, less reference signals can be used. However, the number reference signals may not be configured dynamically, which may cause some problems. For example, if the number of reference signals is not enough, the channel may not be estimated accurately. If the number of reference signals is unnecessarily large, it may waste transmission resources. Therefore, solutions on configuring the reference signals are needed.

In order to solve at least part of the above problems, solutions on adaptive reference signal configuration are proposed. According to embodiments of the present disclosure, a terminal device receives configuration information from a network device. The configuration information at least indicates a set of configurations for transmitting an uplink reference signal. The terminal device receives downlink information from the network device which indicates a target configuration from the set of configurations. The terminal device transmits the uplink reference signal to the network device based on the target configuration. In this way, the configuration of reference signals can be changed dynamically. It can avoid wasting resources. Further, it can also improve accuracy of the estimate.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number.

The communication system 100 further comprises a network terminal device 120. In some embodiments, the network device may be gNB. In the communication system 100, the network devices 120 and the terminal devices 110 can communicate data and control information to each other. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Figure 2:
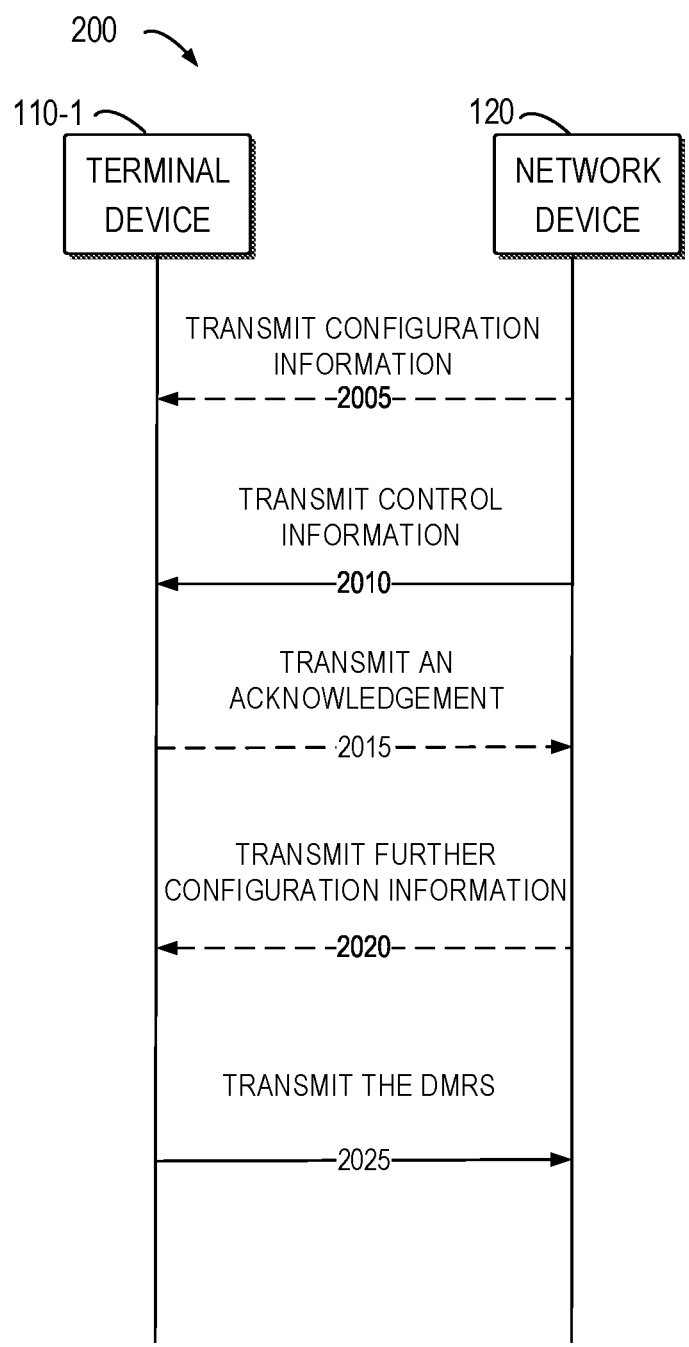
FIG. 2 illustrates a schematic diagram illustrating a process for transmission of uplink control information according to embodiments of the present disclosure.

Embodiments of the present disclosure will be described in detail below. Reference is first made to FIG. 2, which shows a signaling chart illustrating process 200 among network devices according to some example embodiments of the present disclosure. Only for the purpose of discussion, the process 200 will be described with reference to FIG. 1. The process 200 may involve the terminal device 110-1 and the network device 120 in FIG. 1.

In some embodiments, the network device 120 may transmit 2005 configuration information to the terminal device 110-1. The configuration information indicates a set of configurations for transmitting a demodulation reference signal (DMRS). It should be noted that the configuration information can be transmitted using any suitable signaling. For example, the configuration information may be transmitted via RRC signaling. Table 1 shows an example of pseudo-code of the configuration information. It should be noted that Table 1 is only an example not limitation.

TABLE 1

| | |
|---|---|
| DMRS-UplinkConfig ::= | SEQUENCE { |
| dmrs-Type | ENUMERATED {type 2} |
| OPTIONAL, | -- Need S |
| dmrs-AdditionalPosition | ENUMERATED {pos0, pos1, pos3} |
| OPTIONAL, | -- Need S |
| phase TrackingRS | SetupRlease {PTRS-UplinkConfig} |
| OPTIONAL, | -- Need M |

The network device 120 transmits 2010 downlink information to the terminal device 110-1. The downlink information indicates an adaptive demodulation reference signal (DMRS) configuration. In some embodiments, the downlink information may be transmitted in downlink control information (DCI). Alternatively, the downlink information may be transmitted in a medium access control (MAC) control element (CE). In this way, the configuration of the uplink reference signal can be changed dynamically.

In some embodiments, the network device 120 may configure one DMRS configuration for each DMRS port via RRC signaling. In this example embodiment, the downlink information may comprise a field of antenna ports. The terminal device 110-1 may determine the adaptive DMRS configuration based on the field of the antenna ports. For example, the network device 120 may configure the adaptive-dmrs-AdditionalPosition for each DMRS port. When received DCI, the terminal device 110-1 may detect the DCI field of "antenna ports" and determine the number of DMRSs in a slot based on the DCI field of "antenna ports." Table 2 below shows an example of antenna ports and transforms precoder.

TABLE 2

| Value | Number of DMRS CDM group(s) without data | DMRS port(s) | Number of front-load symbols |
|---|---|---|---|
| 0 | 2 | 0 | 1 |
| 1 | 2 | 1 | 1 |
| 2 | 2 | 2 | 1 |
| 3 | 2 | 3 | 1 |
| 4 | 2 | 0 | 2 |
| 5 | 2 | 1 | 2 |
| 6 | 2 | 2 | 2 |
| 7 | 2 | 3 | 2 |
| 8 | 2 | 4 | 2 |
| 9 | 2 | 5 | 2 |
| 10 | 2 | 6 | 2 |
| 11 | 2 | 7 | 2 |
| 12-15 | Reserved | Reserved | Reserved |

Only as an example, the network device 120 may configure that port 0 corresponds to pos 2 and port 2 corresponds to pos 1. If the port 0 is indicated in the DCI, the adaptive-dmrs-AdditionalPosition pos 2 may be assumed by the terminal device 110-1 to determine the target configuration.

In some embodiments, the downlink information may comprise parameter adaptive-dmrs-AdditionalPosition. In some embodiments, the parameter adaptive-dmrs-AdditionalPosition may overwrite dmrs-AdditionalPosition which is transmitted in the RRC signaling. Alternatively or in addition, the adaptive-dmrs-AdditionalPosition may be a differential signal. For example, the terminal device 110-1 may determine the target configuration for the uplink reference signal based on the adaptive-dmrs-AdditionalPosition and dmrs-AdditionalPosition.

In other embodiments, the configuration information may comprise usage of the adaptive DMRS configuration. For example, the configuration information may indicate a DCI format for the adaptive DMRS configuration. Alternatively or in addition, the configuration information may indicate a control resource set (CORESET) for the adaptive DMRS configuration. Only as an example, the configuration information which may be transmitted via RRC signaling may indicate that the adaptive DMRS configuration may apply to a configured DCI format (for example, format 0-1) and/or configured COREST. For other DCI formats and/or COREST, the terminal device 110-1 may determine the uplink reference by RRC parameter dmrs-AdditionalPosition. In this way, it allows fall back DCI scheduling which avoids error spread in case of MAC CE singing error.

In some embodiments, the downlink information may comprise an indication indicating the number of transmission positions for the DMRS is reduced to a predetermined number. For example, the terminal device 110-1 may apply pos0 of the DMRS position based on the downlink information, which means 1 symbol DMRS is applied. In this way, it can achieve better performance with high signal-to-noise ratio.

The terminal device 110-1 may transmit 2015 an acknowledgment to the downlink information to the network device 120. The terminal device 110-1 may adopt the adaptive DMRS configuration of the DMRS after a period associated with a time point of transmitting the acknowledgment. Only as an example, the acknowledgment may be transmitted in slot n. In this example, the terminal device 110-1 may adopt the after the period slot (n+1)+3 ms.

In some embodiments, the network device 120 may transmit 2020 further configuration information to the terminal device 110-1. In some embodiments, the further configuration information may be DCI and indicate a grant of a physical uplink channel. Only as an example, if the DCI is received after the period slot (n+1)+3 ms, the target configuration can be applied to the physical uplink channel granted by the DCI. Alternatively, if the DCI is received before the slot (n+1)+3 ms, the target configuration may not be applied to the physical uplink channel granted by the DCI. In other embodiments, the further configuration information may indicate a set of configured grant physical channels. If the physical uplink channel is located after the slot (n+1)+3 ms, the target configuration may be applied to the physical uplink channel. If the physical uplink channel is located before the slot (n+1)+3 ms, the target configuration may not be applied to the physical uplink channel. In this way, it avoids ambiguity in when to apply the target configuration. It should be noted that embodiments of the present disclosure can be applied to any suitable scenarios, for example, PUCCH reception.

Figure 3:
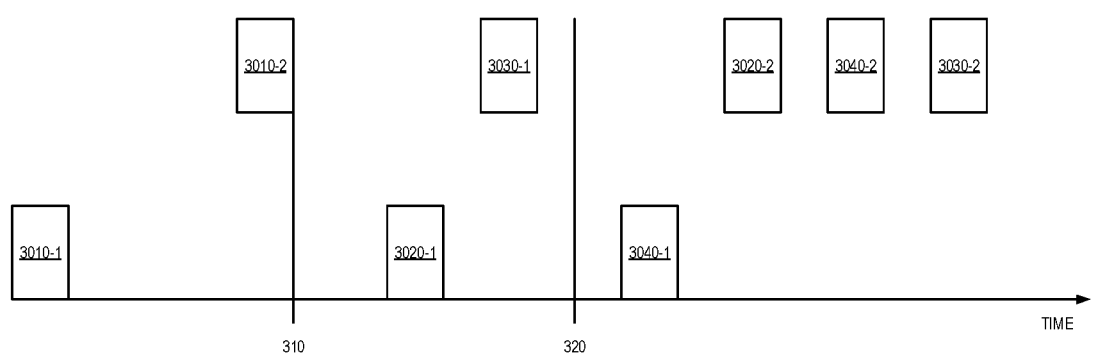
FIG. 3 illustrates a schematic diagram illustrating reception and transmission time points according to embodiments of the present disclosure.

With the reference to FIG. 3, the MAC CE signaled the adaptive-dmrs-AdditionalPosition may be included in PDSCH 3010-1. The acknowledgment 3010-2 may be transmitted in slot 310. The duration between the slot 310 and the time point 320 may be predetermined. The terminal device 110-1 may adopt the target configuration after the slot 320. The DCI 3020-1 which may grant the PUSCH 3020-2 may be received before the time point 320. The target configuration of the uplink reference signal may not be applied on the PUSCH 3020-2. As shown in FIG. 3, the configured grant (CG) PUSCH 3030-1 is before the time point 320, which means the target configuration may not be applied on the PUSCH 3030-1. The CG PUSCH 3030-2 is after the time point 320, which means the target configuration may be applied on the PUSCH 3030-2. The DCI 3040-1 which may grant the PUSCH 3040-2 may be received after the time point 320. The target configuration of the uplink reference signal may be applied on the PUSCH 3040-2.

Referring back to FIG. 2, the terminal device 110-1 transmits 2025, based on the adaptive DMRS configuration, the DMRS to the network device 120 on the physical uplink channel after the period associated with the time point of transmitting the acknowledgement. Only as an example, if the DMRS is to be transmitted on the PUSCH 3040-2 or 3030-2, the DMRS may be transmitted based on the target configuration. If the DMRS is to be transmitted on the PUSCH 3020-2, the DMRS may be transmitted based on the configuration configured by RRC signaling.

In some embodiments, the terminal device 110-1 may determine at least one resource element which is used for transmitting the DMRS based on the adaptive DMRS configuration. The terminal device 110-1 may map data to the at least one resource element and transmit the data on the at least one resource element. In some embodiments, for an OFDM symbol is data symbol based on the adaptive signaling but is DMRS symbol based on the dmrs-AdditionalPosition configured by RRC, only resource elements that used for DMRS based on dmrs-AdditionalPosition is used to transmit data based on the adaptive signaling. In this way, it avoids breaking orthogonal property. Table 3 below shows examples of PUSCH DMRS positions.

TABLE 3

| | DM-RS positions $\bar{l}$ | | | | | | | |
|---|---|---|---|---|---|---|---|---|
| $l_d$ in symbols | PUSCH mapping type A dmrs-AdditionalPosition | | | | PUSCH mapping type B dmrs-AdditionalPosition | | | |
| | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

For example, if the network device 120 configures pos2, i.e. OS #3, #7, #11 is for DMRS when 14 OS is allocated to the terminal device 110-1. And if adaptive DMRS indicating pos3, i.e. the terminal device 110-1 needs to carry DMRS on OS #3, #5, #8, #11, for OS #7, the terminal device 110-1 only maps data on resources elements that used as if OS #7 is DMRS symbol based on RRC configurations and does not map data on resources elements that not used as if OS #7 is DMRS symbol based on RRC configurations.

Figure 4:
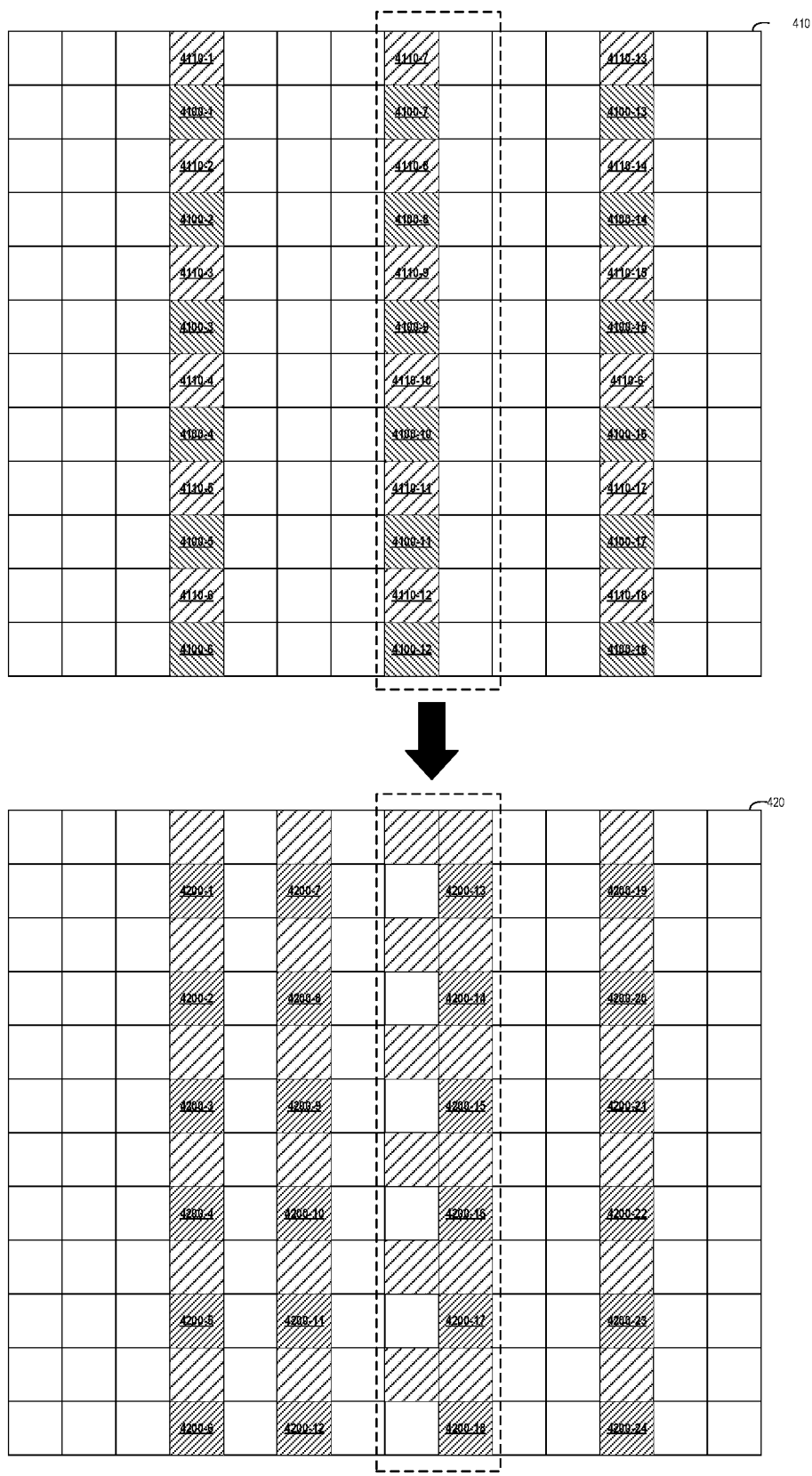
FIG. 4 illustrates a schematic diagram illustrating resource elements according to embodiments of the present disclosure.

With reference to FIG. 4, the network device 120 may configure pos 2 for the DMRS shown as 410. The resource elements 4100-1, 4100-2, 4100-3, 4100-4, 4100-5. 4100-6, 4100-7, 4100-8, 4100-9, 4100-10, 4100-11, 4100-12, 4100-13, 4100-14, 4100-15, 4100-16, 4100-17 and 4100-18 may be used for transmitting DMRSs and the resource elements 4110-1, 4110-2, 4110-3, 4110-4, 4110-5. 4110-6, 4110-7, 4110-8, 4110-9, 4110-10, 4110-11, 4110-12, 4110-13, 4110-14, 4110-15, 4110-16, 4110-17 and 4110-18 may be blank. Other resource elements may be used for transmitting data. After the adaptive DMRS configuration, the network device 120 may configure pos 3 for the DMRS shown as 420. As shown in FIG. 4, the resource elements 4200-1, 4200-2, 4200-3, 4200-4, 4200-5. 4200-6, 4200-7, 4200-8, 4200-9, 4200-10, 4200-11, 4200-12, 4200-13, 4200-14, 4200-15, 4200-16, 4200-17, 4200-18, 4200-19, 4200-20, 4200-21, 4200-22, 4200-23 and 4200-24 may be used for transmitting DMRSs. Resource elements on the 9$^{th}$ column may be used for transmitting the DMRSs. The resource elements for transmitting the DMRSs on the 8$^{th}$ column in pos 2 may be used for transmitting data in pos 3.

Figure 5:
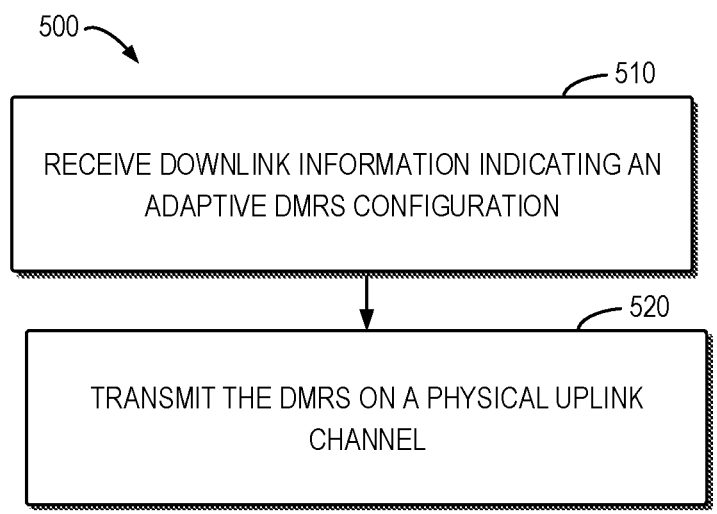
FIG. 5 illustrates a flow chart of an example method of communication implemented at a terminal device in accordance with some embodiments of the present disclosure.

FIG. 5 shows a flowchart of an example method 500 in accordance with an embodiment of the present disclosure. Only for the purpose of illustrations, the method 500 can be implemented at a terminal device 110-1 as shown in FIG. 1.

In some embodiments, the terminal device 110-1 may receive configuration information from the terminal device 120. The configuration information indicates a set of configurations for transmitting a demodulation reference signal (DMRS). It should be noted that the configuration information can be transmitted using any suitable signaling. For example, the configuration information may be transmitted via RRC signaling.

At block 510, the terminal device 110-1 transmits downlink information to the terminal device 110-1. The downlink information indicates an adaptive DMRS configuration. In some embodiments, the downlink information may be transmitted in downlink control information (DCI). Alternatively, the downlink information may be transmitted in a medium access control (MAC) control element (CE). In this way, the configuration of the DMRS can be changed dynamically.

In some embodiments, the network device 120 may configure one DMRS configuration for each reference signal port via RRC signaling. In this example embodiment, the downlink information may comprise a field of antenna ports. The terminal device 110-1 may determine the adaptive DMRS configuration based on the field of the antenna ports. For example, the network device 120 may configure the adaptive-dmrs-AdditionalPosition for each DMRS port. When received DCI, the terminal device 110-1 may detect the DCI field of "antenna ports" and determine the number of DMRSs in a slot based on the DCI field of "antenna ports."

Only as an example, the network device 120 may configure that port 0 corresponds to pos 2 and port 2 corresponds to pos 1. If the port 0 is indicated in the DCI, the adaptive-dmrs-AdditionalPosition pos 2 may be assumed by the terminal device 110-1 to determine the target configuration.

In some embodiments, the downlink information may comprise parameter adaptive-dmrs-AdditionalPosition. In some embodiments, the parameter adaptive-dmrs-AdditionalPosition may overwrite dmrs-AdditionalPosition which is transmitted in the RRC signaling. Alternatively or in addition, the adaptive-dmrs-AdditionalPosition may be a differential signal. For example, the terminal device 110-1 may determine the target configuration for the uplink reference signal based on the adaptive-dmrs-AdditionalPosition and dmrs-AdditionalPosition.

In other embodiments, the configuration information may indicate a DCI format for the adaptive DMRS configuration. Alternatively or in addition, the configuration information may indicate a control resource set (CORESET) for the adaptive DMRS configuration. Only as an example, the configuration information which may be transmitted via RRC signaling may indicate that the adaptive DMRS configuration may apply to a configured DCI format (for example, format 0-1) and/or configured COREST. For other DCI formats and/or COREST, the terminal device 110-1 may determine the uplink reference by RRC parameter dmrs-AddotopmaPosition. In this way, it allows fall back DCI scheduling which avoids error spread in case of MAC CE singing error.

In some embodiments, the downlink information may comprise an indication indicating the number of transmission positions for the DMRS is reduced to a predetermined number. For example, the terminal device 110-1 may apply pos0 of the DMRS position based on the downlink information, which means 1 symbol DMRS is applied. In this way, it can achieve better performance with high signal-to-noise ratio.

In some embodiments, the terminal device 110-1 may transmit an acknowledgment to the downlink information to the network device 120. The terminal device 110-1 may adopt the adaptive DMRS configuration of the DMRS after a period associated with a time point of transmitting the acknowledgment. Only as an example, the acknowledgment may be transmitted in slot n. In this example, the terminal device 110-1 may adopt the after the period slot (n+1)+3 ms.

In some embodiments, the network device 120 may transmit 2020 further configuration information to the terminal device 110-1. In some embodiments, the further configuration information may be DCI and indicate a grant of a physical uplink channel. Only as an example, if the DCI is received after the period slot (n+1)+3 ms, the target configuration can be applied to the physical uplink channel granted by the DCI. Alternatively, if the DCI is received before the slot (n+1)+3 ms, the target configuration may not be applied to the physical uplink channel granted by the DCI. In other embodiments, the further configuration information may indicate a set of configured grant physical channels. If the physical uplink channel is located after the slot (n+1)+3 ms, the target configuration may be applied to the physical uplink channel. If the physical uplink channel is located before the slot (n+1)+3 ms, the target configuration may not be applied to the physical uplink channel. In this way, it avoids ambiguity in when to apply the target configuration. It should be noted that embodiments of the present disclosure can be applied to any suitable scenarios, for example, PUCCH reception.

At block 520, the terminal device 110-1 transmits, based on the adaptive DMRS configuration, the DMRS to the network device 120 on the physical uplink channel after the period associated with the time point of transmitting the acknowledgement.

In some embodiments, the terminal device 110-1 may determine at least one resource element which is used for transmitting the DMRS based on the adaptive DMRS configuration. The terminal device 110-1 may map data to the at least one resource element and transmit the data on the at least one resource element. In some embodiments, for an OFDM symbol is data symbol based on the adaptive signaling but is DMRS symbol based on the dmrs-AdditionalPosition configured by RRC, only resource elements that used for DMRS based on dmrs-AdditionalPosition is used to transmit data based on the adaptive signaling. In this way, it avoids breaking orthogonal property.

Figure 6:
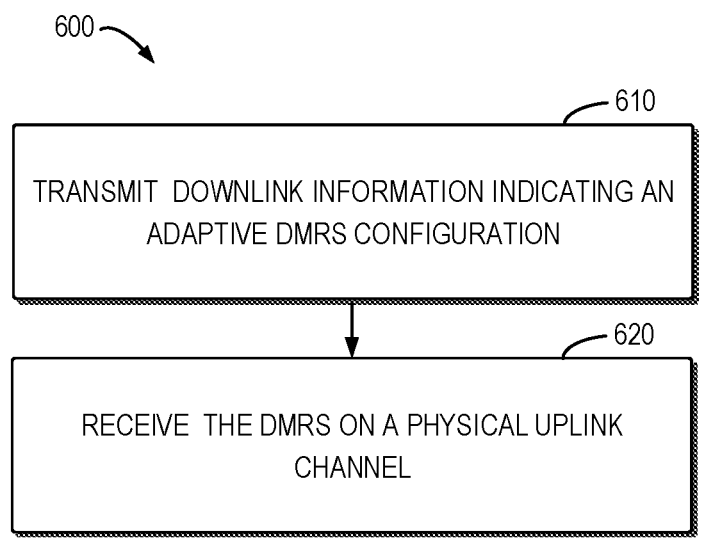
FIG. 6 illustrates a flow chart of an example method of communication implemented at a terminal device in accordance with some embodiments of the present disclosure.

FIG. 6 shows a flowchart of an example method 600 in accordance with an embodiment of the present disclosure. Only for the purpose of illustrations, the method 600 can be implemented at a network device 120 as shown in FIG. 1.

In some embodiments, the network device 120 may transmit configuration information to the terminal device 110-1. The configuration information indicates a set of configurations for transmitting a demodulation reference signal (DMRS). It should be noted that the configuration information can be transmitted using any suitable signaling. For example, the configuration information may be transmitted via RRC signaling.

At block 610, the network device 120 transmits downlink information to the terminal device 110-1. The downlink information indicates an adaptive demodulation reference signal (DMRS) configuration. In some embodiments, the downlink information may be transmitted in downlink control information (DCI). Alternatively, the downlink information may be transmitted in a medium access control (MAC) control element (CE). In this way, the configuration of the uplink reference signal can be changed dynamically.

In some embodiments, the network device 120 may configure one DMRS configuration for each reference signal port via RRC signaling. In this example embodiment, the downlink information may comprise a field of antenna ports.

In some embodiments, the downlink information may comprise parameter adaptive-dmrs-AdditionalPosition. In some embodiments, the parameter adaptive-dmrs-AdditionalPosition may overwrite dmrs-AdditionalPosition which is transmitted in the RRC signaling. Alternatively or in addition, the adaptive-dmrs-AdditionalPosition may be a differential signal. For example, the terminal device 110-1 may determine the adaptive DMRS configuration for the uplink reference signal based on the adaptive-dmrs-AdditionalPosition and dmrs-AdditionalPosition.

In other embodiments, the configuration information may indicate a DCI format for the adaptive DMRS configuration. Alternatively or in addition, the configuration information may indicate a control resource set (CORESET) for the adaptive DMRS configuration. Only as an example, the configuration information which may be transmitted via RRC signaling may indicate that the adaptive DMRS configuration may apply to a configured DCI format (for example, format 0-1) and/or configured COREST. In this way, it allows fall back DCI scheduling which avoids error spread in case of MAC CE singling error.

In some embodiments, the network device 120 may receive an acknowledgment to the downlink information from the terminal device 110-1. In some embodiments, the network device 120 may transmit 2020 further configuration information to the terminal device 110-1. In some embodiments, the further configuration information may be DCI and indicate a grant of a physical uplink channel.

At block 620, the network device 120 receives, based on the adaptive DMRS configuration, the DMRS from the terminal device 110-1 on the physical uplink channel after the period associated with the time point of transmitting the acknowledgement.

Figure 7:
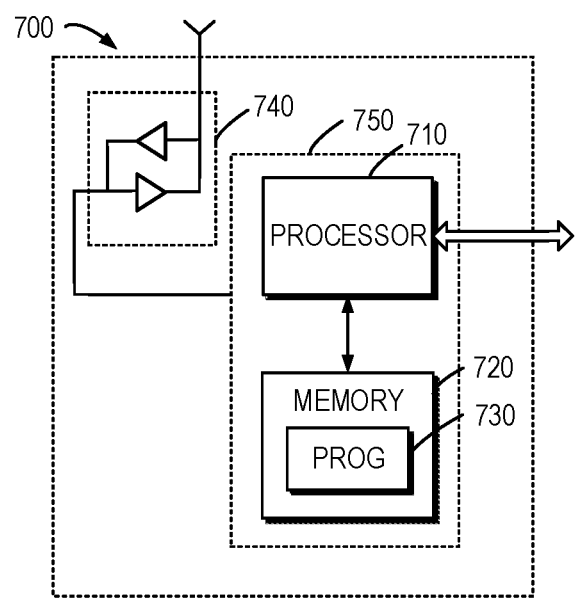
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 120 or the terminal device 110 as shown in FIG. 1. Accordingly, the device 700 can be implemented at or as at least a part of the terminal device 110 or the network device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 2-6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 1100, there may be several physically distinct memory modules in the device 1100. The processor 710 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 1 to 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A communication method comprising:
  receiving, at a terminal device and from a network device, downlink information indicating an adaptive demodulation reference signal (DMRS) configuration;
  transmitting, to the network device, and based on the adaptive DMRS configuration, a DMRS on a physical uplink channel after a period associated with a time point of transmitting an acknowledgement to the downlink information; and
  receiving, from the network device, further downlink information indicating a grant of the physical uplink channel,
  wherein the transmitting the DMRS comprises:
    in accordance with a determination that a reception time point of the further downlink information is after the period, transmitting the DMRS based on the adaptive DMRS configuration.

2. The method of claim 1, further comprising:
  receiving, from the network device, configuration information indicating a set of configured grant physical uplink channels,
  wherein the transmitting the DMRS comprises:
    in accordance with a determination that the physical uplink channel in the set of configured grant physical uplink channels is after the period, transmitting the DMRS based on the adaptive DMRS configuration.

3. The method of claim 1, wherein the downlink information comprises an adaptive-dmrs-AdditionalPosition parameter and the downlink information is a differential signal, the method further comprising:
  determining the DMRS based on the adaptive-dmrs-AdditionalPosition parameter and a dmrs-AdditionalPosition parameter.

4. The method of claim 1, wherein the downlink information comprises an adaptive-dmrs-AdditionalPosition parameter, the method further comprising:
  overwriting a dmrs-AdditionalPosition parameter with the adaptive-dmrs-AdditionalPosition parameter.

5. The method of claim 1, further comprising:
  receiving further configuration information indicating at least one of the following:
    a downlink control information format for the adaptive DMRS configuration; or
    a control resource set for the adaptive DMRS configuration.

6. The method of claim 1, wherein the receiving the downlink information comprises:
  receiving, from the network device, the downlink information comprising a field of antenna ports; and
  determining the adaptive DMRS configuration based on the field of antenna ports.

7. The method of claim 1, further comprising:
  mapping data to a resource element which is used for transmitting the DMRS based on the adaptive DMRS configuration; and
  transmitting, to the network device, the data on the resource element.

8. The method of claim 1, wherein the downlink information comprises an indication indicating the number of transmission positions for the DMRS is reduced to a predetermined number.

9. A communication method comprising:
  transmitting, at a network device and to a terminal device, downlink information indicating an adaptive demodulation reference signal (DMRS) configuration;
  receiving, from the terminal device, and based on the adaptive DMRS configuration, a DMRS on a physical uplink channel after a period associated with a time point of receiving an acknowledgement of the downlink information; and
  transmitting, to the terminal device, further downlink information indicating a grant of the physical uplink channel,
  wherein the receiving the DMRS comprises:
    in accordance with a determination that a reception time point of the further downlink information is after the period, receiving the DMRS based on the adaptive DMRS configuration.

10. The method of claim 9, further comprising:
  transmitting, to the terminal device, configuration information indicating a set of configured grant physical uplink channels,
  wherein the receiving the DMRS comprises:
    in accordance with a determination that the physical uplink channel in the set of configured grant physical uplink channels is after the period, receiving the DMRS based on the adaptive DMRS configuration.

11. The method of claim 9, further comprising:
  transmitting further configuration information indicating at least one of the following:
    a downlink control information format for the adaptive DMRS configuration; or
    a control resource set for the adaptive DMRS configuration.

12. The method of claim 9, wherein the transmitting the downlink information comprises:

transmitting, to the terminal device, the downlink information comprising a field of antenna ports associated with the adaptive DMRS configuration.

13. The method of claim 9, further comprising:
receiving data on a resource element which is used for receiving the DMRS based on the adaptive DMRS configuration.

14. The method of claim 9, wherein the downlink information comprises an indication indicating the number of transmission positions for the uplink reference signal is reduced to a predetermined number.

15. A terminal device comprising:
a processor; and
a memory coupled to the processor and storing instructions thereon, the instructions, when executed by the processor, causing the terminal device to:
receive, from a network device, downlink information indicating an adaptive demodulation reference signal (DMRS) configuration;
transmit, to the network device, and based on the adaptive DMRS configuration, a DMRS on a physical uplink channel after a period associated with a time point of transmitting an acknowledgement to the downlink information; and
receive, from the network device, further downlink information indicating a grant of the physical uplink channel,
wherein the terminal device is caused to transmit the DMRS by:
in accordance with a determination that a reception time point of the further downlink information is after the period, transmitting the DMRS based on the adaptive DMRS configuration.

16. The terminal device of claim 15, wherein the terminal device is further caused to:
receive, from the network device, configuration information indicating a set of configured grant physical uplink channels,
wherein the terminal device is caused to transmit the DMRS by:
in accordance with a determination that the physical uplink channel in the set of configured grant physical uplink channels is after the period, transmitting the DMRS based on the adaptive DMRS configuration.

17. The terminal device of claim 15, wherein the downlink information comprises an adaptive-dmrs-AdditionalPosition parameter and the downlink information is a differential signal, and
wherein the terminal device is further caused to:
determine the DMRS based on the adaptive-dmrs-AdditionalPosition parameter and a dmrs-AdditionalPosition parameter.

* * * * *